United States Patent
Jarrett et al.

(10) Patent No.: US 6,616,109 B1
(45) Date of Patent: Sep. 9, 2003

(54) WASTE BASKET MOUNTING DEVICE

(76) Inventors: Shawn R. Jarrett, 585 E. Lake Dr., Edwardsville, IL (US) 62025; David R. Murphey, 1311 Mary Dr., Edwardsville, IL (US) 62025

( * ) Notice: Subject to any disclaimer, the term of this patent is extended or adjusted under 35 U.S.C. 154(b) by 0 days.

(21) Appl. No.: 09/482,733

(22) Filed: Jan. 13, 2000

Related U.S. Application Data

(60) Provisional application No. 60/116,051, filed on Jan. 14, 1999.

(51) Int. Cl.[7] .............................................. F16M 11/00
(52) U.S. Cl. ..................... 248/201; 248/312.1; 248/907; 312/321.5; 312/291
(58) Field of Search ................................ 248/907, 154, 248/213.2, 310, 313, 316.1, 201, 312.1; 312/321.5, 291

(56) References Cited

U.S. PATENT DOCUMENTS

| | | | |
|---|---|---|---|
| 2,142,868 A | * 1/1939 | Di Vincenzo | 248/274.1 |
| 2,546,797 A | * 3/1951 | Swisher et al. | 248/311.2 |
| 2,554,048 A | * 5/1951 | Morrison et al. | 220/324 |
| 2,558,939 A | 7/1951 | Dornbush | |
| 2,600,917 A | * 6/1952 | Petersen | 211/87.01 |
| 3,211,509 A | 10/1965 | Sender | |
| 3,224,717 A | * 12/1965 | Mott | 211/86 |
| 3,268,086 A | * 8/1966 | Hendrickson | 211/85.19 |
| 3,285,686 A | 11/1966 | Beaver | |
| 3,478,997 A | * 11/1969 | Goss | 248/201 |
| 3,602,568 A | 8/1971 | Bernhardsson | |
| 3,892,315 A | * 7/1975 | Johnson | 211/85.19 |
| 4,071,976 A | * 2/1978 | Chernewski | 47/39 |
| 4,527,695 A | * 7/1985 | Arms | 211/85.19 |
| 4,531,246 A | 7/1985 | Earley | |
| 5,108,164 A | * 4/1992 | Gonzalez | 312/321.5 |
| 5,251,975 A | * 10/1993 | Braun et al. | 312/334.16 |
| 5,320,319 A | * 6/1994 | Winger et al. | 248/312.1 |
| 5,632,401 A | * 5/1997 | Hurd | 220/407 |

* cited by examiner

Primary Examiner—Korie Chan
(74) Attorney, Agent, or Firm—Paul M Denk

(57) ABSTRACT

A mounting device including an upper and lower bracket. The lower bracket is generally L-shaped, for supporting the base of a waste basket or container. The upper bracket includes a flanged device that can be mounted to the interior of any door and support the upper lip or upper edge of a waste basket or container in position while the lower bracket supports the lower wall of any waste basket or container in place during usage.

1 Claim, 2 Drawing Sheets

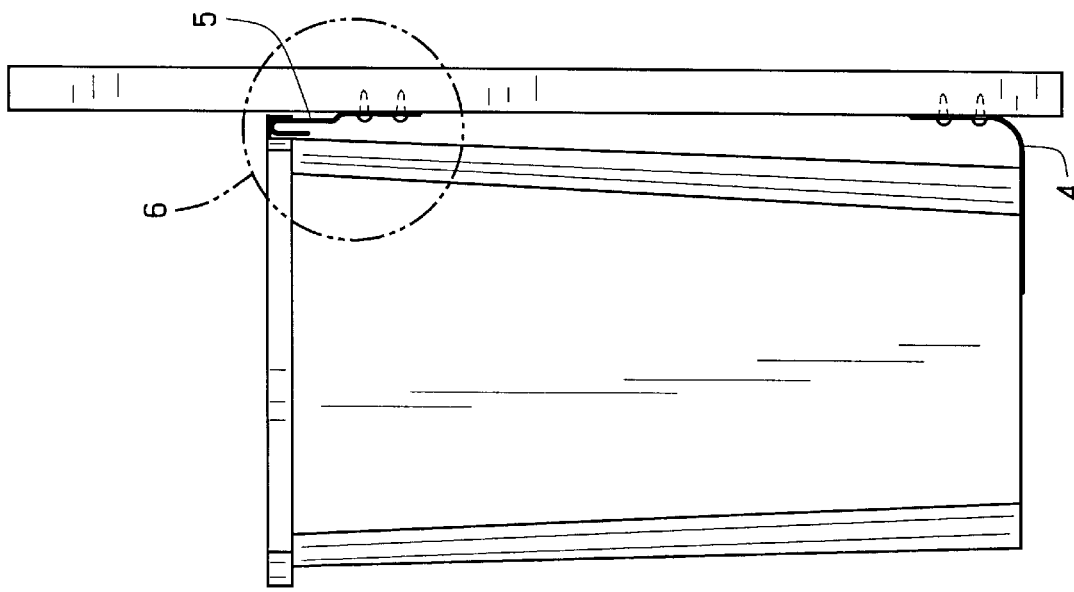
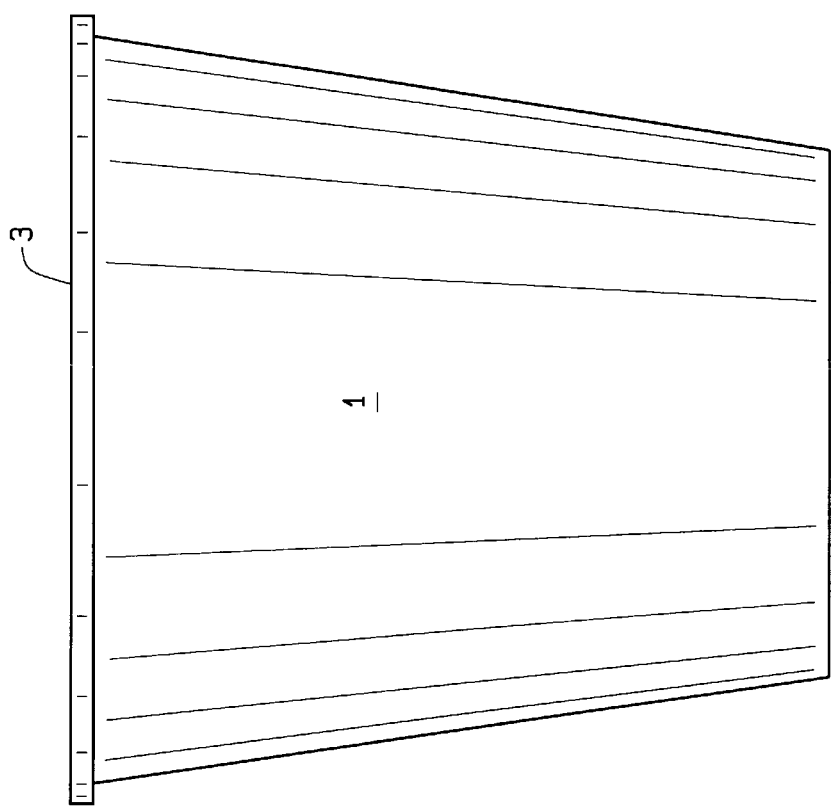
FIG. 1
FIG. 2

WASTE BASKET MOUNTING DEVICE

CROSS-REFERENCE TO RELATED APPLICATION:

This utility patent application is a non-provisional patent application based upon provisional patent application having Ser. No. 60/116,051, filed on Jan. 14, 1999, which is by the same inventors.

BACKGROUND OF THE INVENTION

This invention relates generally to a means for mounting a waste basket to the interior of a door, such as a cabinet door, closet door, or any other wall to which brackets may be appended, for suspending a waste basket to the same.

Various types of devices for mounting waste receptacles have been available in the art, and some of them even for use for mounting within a cabinet, such as under sink, or the like, and even to the cabinet door, in order to suspend a waste basket, or the like, thereto, and provide for its general concealment, as when not being used. For example, the patent to Dornbush, U.S. Pat. No. 2,558,939, shows a sanitary storage cabinet, and which includes, on its door, and in its interior, a metallic band, of substantial structure, which is braced to its door, in the corner, and which band provides support for a rubbish container, as can be determined, from this patent. Generally, when the container is located in place, it is totally supported from underneath, and has no means for clipping the same at its upper edge.

The patent to Sender, U.S. Pat. No. 3,211,509, shows a support and enclosure for garbage cans. This appears to be a storage device, for use for concealing garbage cans, rather than leaving them out in the open, as most people generally do. Nevertheless, as can be seen, the device includes a base, of substantial size, that is secured by brackets to the interior of the door panel, that apparently pivot outwardly, upon opening of one or both of the associated doors.

The prior patent to Beaver, U.S. Pat. No. 3,285,686, provides a basket support, and in this particular instance, as can be seen, it includes means for supporting a basket in place, and to, what would appear to be a door. The support includes a shelf, which is rigidly secured to the interior of the door, but as can be also noted, there is included some type of a snap acting clamp, that is also secured to the interior of the door, at its upper edge, and which when inclined downwardly, as along its extending portion, engages the inside of the upper part of the basket, to lock the basket in an upright position, when located upon its support. The support is of substantial size, and is required to provide the initial support, during which time the upper clamp can be snapped into position, to hold the basket in place.

The patent to Bernhardsson, U.S. Pat. No. 3,602,568, shows another type of device for supporting garbage cans or other containers in closets, cupboards, and sink cupboards, etc. The device, includes, as can be seen, a bracket device that secures to the interior of the door frame. The bracket includes a T-rod, at its lower base, for supporting the garbage collection paper bag, while at its upper end, forms a holder ring for supporting the upper end of the bag, and disposes the upper end of the bag for reception of a cover, as can be noted.

The patent to Earley, U.S. Pat. No. 4,531,246, shows a removable garbage holder for kitchen sinks. This device is simply a mounting means that is held by suction cups to the inside of a sink and supports a cylindrical ring, that can be used for holding a garbage bag in place at that location.

While the foregoing and prior art devices are related to the subject matter of the current invention, they do exhibit rather complex structure, fare in excess of the means provided and developed for mounting a waste basket in place, as provided for the two-piece mounting or clamping device of this current invention.

SUMMARY OF THE INVENTION

It is the principal object of this invention to provide means for mounting of a waste basket to the interior of a cabinet door, closet door, or the like, and which requires only two small parts, forming the components for the mounting device, which do not protrude or extend to any extent that may interfere with the storage of other items, within the cabinet or closet, as when the waste basket may be removed, but at the same time, conveniently and stably mount the basket in place, as during usage.

This invention contemplates the formation of a two-piece or two-part device, for use for mounting, and includes, at its lower section, an L-shaped bracket, that mounts directly to the interior of either the cabinet or closet door, and has only that surface required to provide for its stable mounting to the interior of the door, and which is then bent, at its lower edge, integrally outwardly to provide a small platform, to furnish support for the lower portion of a waste basket, or other container, when located in position. The second part of the mounting device includes an upwardly extending tab, that includes a compound bend in it, the integral segment of the tab extending below the bend is provided for accommodating one or more fasteners, such as wood screws, therethrough, for securement of the tab to the interior of the door, while the upper end of the tab, extending upwardly from the compound bend, is conveniently spaced from the surface of the adjacent door, to which it mounts, in order to provide clearance for accommodating the lip of the waste basket, over its upper edge, or the upper tab, in its bent configuration, can embrace the upper edge of a waste basket, and conveniently hold it into position, when mounting such a container in place. Thus, the function of this dual mounting device, is to initially provide support for the weight of the container, and all of the debris deposited in it, at its lower end, and to provide for a holding clamp, at its upper end, to stably hold the upper edge of the container against the door, and to prevent its dislodgment, as during usage.

Thus, contrary to what is shown and described for all the prior art type of storage devices for containers, trash cans, baskets, or the like, and which provide for full peripheral support at the bottom of the container, this particular invention simply furnishes only a small L-bracket, at its bottom, for suspending the waste container upwardly, off the ground, and against the door, during usage.

It is therefore, another object of this invention to provide for a two-part mounting device for holding a waste basket interiorly of any door, whether it be a cabinet door, closet door, or the like.

Another object of this invention is to provide a two-part mounting device that can be used for holding any receptacle against a wall, or the like, and which receptacle can be used for conveniently holding or storing any other items therein.

Another object of this invention is to provide a convenient mounting device that can be easily and quickly installed in place, through a minimum of effort.

Still a further object of this invention is to provide a mounting device that is of small dimensions, and do not interfere with the storage of other items in the adjacent and contiguous space, particularly when the waste basket or container may be removed.

Yet another object of this invention is to provide a mounting device that can stably support a container laden with bulk material, and yet have sufficient strength to support the same in storage, during usage.

Yet another object of this invention is to provide a mounting device that still allows the cabinet door, to which it secures, to be easily opened for attaining access into the cabinet, without effort.

Another object is to provide a mounting device that yet allows the facile removal and replacement of a waste basket, during usage.

Still another object of this invention is to provide a device that supports the waste basket from below, and stabilizes it in proximity of its top rim or lip.

Yet another object of this invention is to provide a mounting device that can be used in the kitchen, bathroom, workroom, tool room, storage room, or at any other position where a surface is available for holding the installation of the mounting device of this invention, for supporting a waste basket or other container in place.

Another object of this invention is to provide a mounting device that can be used in a galley for boats.

An additional object of this invention is to provide a mounting a device that can be practically made from plastic, aluminum, steel, or from other materials, and yet provide adequate support to a burdened waste basket, or other container, when filled with a storage medium.

Other objects or purposes for this invention may occur to those skilled in the art upon reviewing the summary of the invention as provided herein, and upon undertaking a study of the description of its preferred embodiment, in view of the drawings.

BRIEF DESCRIPTION OF THE DRAWINGS

In referring to the drawings,

FIG. 1 provides a view of a standard waste basket or waste container;

FIG. 2 shows the waste basket mounted to the interior of a cabinet door through the application of the mounting device of this invention;

DESCRIPTION OF THE PREFERRED EMBODIMENT

In referring to FIG. 1 of the drawings, it shows a waste basket B of this invention, which is designed of the usual configuration, sometimes having a beveled side wall, as at 1, or which can be straight, having a bottom wall 2 and top lip or rim 3, as noted.

In referring to FIG. 2 the waste basket or container of this invention is shown mounted in place, to the interior of a cabinet door C, through the usage of the lower bracket 4 and the upper bracket 5 as noted.

Figure 3:
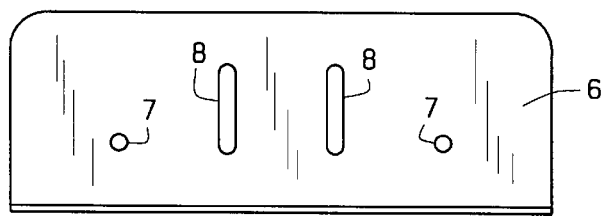
FIG. 3 is a front view of the lower bracket of the mounting device of this invention.
Figure 4:
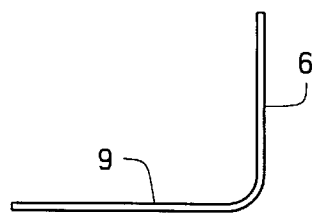
FIG. 4 is a side view of the lower bracket of the mounting device of this invention.
Figure 5:
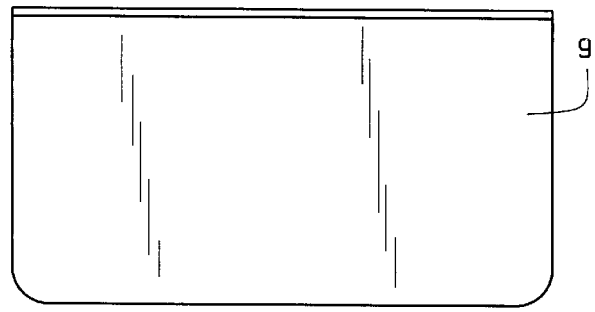
FIG. 5 is a top plan view of the lower bracket of the mounting device of this invention.

In referring to FIGS. 3 through 5, it can be seen that the lower bracket includes an upstanding wall or flange 6, of some width, and which includes a series of apertures, as at 7, or elongated slots, as at 8, and which are designed for accommodating fasteners (not shown) therethrough, when securing the lower bracket to the interior of a door C, as previously explained. If the installer knows exactly where the lower bracket is to be mounted, then all he need do is predrill holes in the door through the apertures 7, and screw the lower bracket in place. If it is uncertain as to the exact location of the lower bracket, then holes may be predrilled in the door through the elongated slots 8, which will allow the lower bracket 4 to be shifted vertically, into a proper adjustment and alignment, having the proper height for accommodating, rather precisely, the storage and suspension of a waste basket or other container thereon.

The lower bracket 4 also includes an integral base flange, as at 9, usually bent or molded at a 90° angle with respect to the upstanding flange 6, as can be seen. This type of a lower bracket may be fabricated of metal, bent to the configuration as shown, may have some degree of radius at its corner, as at 10, or it may be molded at an exact right angle, if desired.

Figure 6:
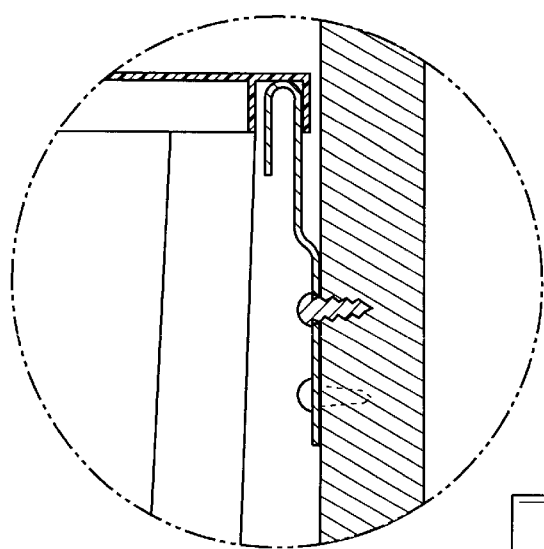
FIG. 6 is a side view of the upper bracket of the mounting device of this invention, shown secured to the interior of a door, and supporting the upper rim of the waste basket in place.
Figure 7:
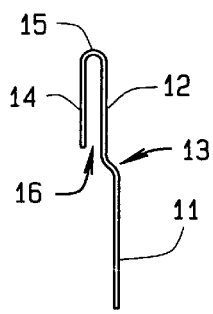
FIG. 7 is a side view of just the upper bracket of the mounting device of this invention.
Figure 8:
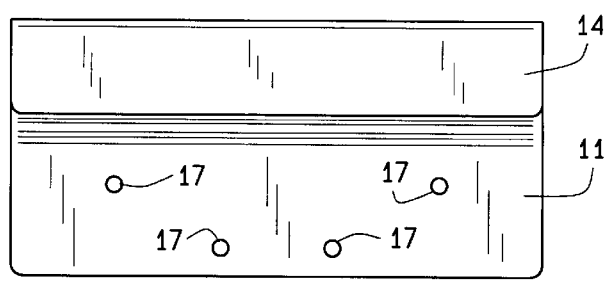
FIG. 8 is a front view of the upper bracket of the mounting device of this invention.

The upper bracket of the mounting device is shown in FIGS. 7 and 8, and as can be seen, the bracket includes a lower flange as at 11, an upper flange 12, and a compound curve as at 13, so as to provide clearance between the upstanding flange 12, and the surface of any door to which the flange 11 secures, and to provide that space necessary for accommodating the upper lip, as at L, of the waste basket or container, as can be seen in FIG. 6. In addition, the upper flange 12 may be bent over, to form an outer tab 14, which has a dual purpose. Initially, it provides a smooth and rounded upper edge 15 for allowing the seating of the lip L of the waste basket thereon, when that type of a container is mounted in place, and also to provide clearance between the flange 12, and the tab 14, as at the vicinity of 16, so that a waste basket that does not have a lip at its upper edge, but simply has a straight upper edge, can be slipped into the clearance 16, and held into position at that location, just prior to sliding the bottom or base 2 of the waste basket onto the base flange 9, of the lower bracket, to hold the container in place, as during storage and usage. As can further be seen, as in FIG. 8, there are a series of apertures 17 provided through the lower flange 11, and which may accommodate one or more fasteners (not shown) therethrough, when securing the upper bracket of the mounting device in place, during its initial installation.

As can be readily determined, once the upper and lower brackets are located into position, and their fasteners secure the same in place, with proper alignment between the space between the upper bracket, and the lower bracket, for accommodating a waste basket, all that the user need do is to simply rest the waste basket, at its upper lip, over the curve 15 of the flange 12 of the upper bracket 5, into place, and then rest the bottom of the waste basket onto the base flange 9 of the lower bracket 4. Or, if it is the style of waste basket that does not contain a lip, then the upper edge of the waste basket may be simply slipped into the clearance slot 16, until sufficient clearance is provided at its bottom, and which time the lower wall 2 of the waste basket may come to rest upon the base flange 9 of the lower bracket 4, as previously described.

Thus, the convenience afforded through the mounting device of this invention, and which is of minimum size and dimensions, so as to not protrude too extensively into the interior of any cabinet, or closet, as when not supporting a waste basket, can be obtained from usage of the mounting device of this invention. Furthermore, even though these upper and lower bracket components are of smaller size, their structural integrity is sufficient so as to support a waste basket or other container in storing waste material, debris, or stored items, as desired and required.

Variations or modifications to the subject matter of this invention may occur to those skilled in the art upon reviewing the development as provided herein. Such variations or modifications, if within the spirit of this development, are intended to be encompassed within the scope of any invention described herein. The description of the preferred embodiment, and the drawings as set forth, are provided for illustrative purposes only.

Having thus described the invention what is claimed and desired to be secured by letters patent is:

1. A waste basket having a lip in combination with a waste basket mounting device for use for mounting said waste basket to the interior of a cabinet door, comprising: an upper bracket and a lower bracket, said brackets being separate, said upper bracket and said lower bracket connected to the interior of said cabinet door; the lower bracket comprising an angle, said angle formed having an upwardly extending vertical flange and a short length of a horizontal integral flange when connected to and extending from said cabinet door, both said vertical flange and horizontal flange having substantial width but less than the width of said cabinet door, said horizontal integral flange provided for supporting the approximate edge of a waste basket rested thereon, the vertical flange having a series of horizontally aligned apertures provided therethrough, select of said apertures provided in the vertical flange formed as approximately vertically disposed slots, to provide for adjustment in the attachment of said lower bracket to the interior of said cabinet door upon set up of the upper bracket and lower bracket to said cabinet door in preparation for usage of the waste basket mounting device, said apertures of the vertical flange accommodating fasteners for securement of the lower bracket to the interior of said cabinet door, the upper bracket formed as a multi-flanged member, having upper and lower flanges, said lower flange disposed for securement to the interior of said cabinet door, said upper flange integrally formed with said lower flange, and being bent over and offset from said lower flange so as to provide clearance between the upper bracket and said cabinet door for accommodating the insertion of the lip of a waste basket over the upper bracket and rest there upon, an outer tab bent over and integrally formed with the upper flange, said outer tab and the upper flange providing an upper edge forming a clearance slot with said cabinet door and onto which the lip of a waste basket may be located, to provide for retention of a waste basket to said upper bracket upon said cabinet door, whereby said upper bracket may secure the lip of a waste basket between the upper flange and the interior of said cabinet door while said lower bracket supports the mounting of the waste basket thereon.

* * * * *